United States Patent
King et al.

(10) Patent No.: US 7,478,140 B2
(45) Date of Patent: Jan. 13, 2009

(54) SYSTEM AND METHOD FOR SENDING ELECTRONIC MAIL AND PARCEL DELIVERY NOTIFICATION USING RECIPIENT'S IDENTIFICATION INFORMATION

(75) Inventors: Tim King, Elkridge, MD (US); Alan Slater, Clifton, VA (US); Victor Forman, Tucson, AZ (US); Tim Waggoner, Mitchellville, MD (US)

(73) Assignee: Pitney Bowes Software Inc., Lanham, MD (US)

( * ) Notice: Subject to any disclaimer, the term of this patent is extended or adjusted under 35 U.S.C. 154(b) by 1584 days.

(21) Appl. No.: 09/801,725

(22) Filed: Mar. 9, 2001

(65) Prior Publication Data

US 2002/0002590 A1     Jan. 3, 2002

Related U.S. Application Data (60) Provisional application No. 60/188,006, filed on Mar. 9, 2000.

(51) Int. Cl.
  *G06F 15/16* (2006.01)
(52) U.S. Cl. ..................................... 709/217
(58) Field of Classification Search ............... 709/200, 709/203, 206, 217, 223, 235, 238–239, 245; 283/67, 79; 705/40, 400–418
See application file for complete search history.

(56) References Cited

U.S. PATENT DOCUMENTS

| | | | |
|---|---|---|---|
| 5,648,916 A * | 7/1997 | Manduley | 700/90 |
| 5,699,528 A * | 12/1997 | Hogan | 705/40 |
| 5,737,729 A * | 4/1998 | Denman | 705/401 |
| 5,805,810 A | 9/1998 | Maxwell | |
| 5,923,848 A | 7/1999 | Goodhand et al. | |
| 5,944,787 A * | 8/1999 | Zoken | 709/206 |
| 6,015,167 A * | 1/2000 | Savino et al. | 283/67 |
| 6,343,327 B2 * | 1/2002 | Daniels et al. | 709/239 |
| 6,732,278 B2 * | 5/2004 | Baird et al. | 713/201 |
| 6,775,690 B1 * | 8/2004 | Creswell et al. | 709/206 |

FOREIGN PATENT DOCUMENTS

WO   WO 00/68801   * 11/2000

OTHER PUBLICATIONS

Screenshot of Infospace web page, undated.*
Screenshot of The Ultimate Email Directory web page, 1997.*
Screenshot of Microsoft Outlook Email, undated.*

* cited by examiner

*Primary Examiner*—Khanh Dang
(74) *Attorney, Agent, or Firm*—George M. Macdonald; Steven J. Shapiro; Angelo N. Chaclas (57) ABSTRACT

The present invention is a system and method for routing e-mails based on the recipient's physical address. The system includes an e-mail server that contains a database that maps physical addresses to e-mail addresses of users. The e-mail server is connected to a network such as the global Internet. The e-mail server includes an electronic mailbox for each physical address in the database. The system also includes a receiving host that is used to connect to the e-mail server via the Internet to enable a recipient user to check e-mail. The e-mail server runs an authoritative process by which user login and password information is checked to assure a secure system. The system also has a parcel delivery notification feature that allows a buyer expecting a parcel to receive delivery status information regarding the particular parcel being shipped to the buyer.

20 Claims, 6 Drawing Sheets

SYSTEM AND METHOD FOR SENDING ELECTRONIC MAIL AND PARCEL DELIVERY NOTIFICATION USING RECIPIENT'S IDENTIFICATION INFORMATION

This application claims priority to the provisional application 60/188,006, filed on Mar. 9, 2000, which is incorporated by reference in its entirety herein.

BACKGROUND OF THE INVENTION

1. Field of the Invention

The present invention relates generally to routing of electronic mail. More particularly, the present invention relates to using a physical address of a recipient to send an electronic mail message.

2. Related Art

In a conventional electronic mail system. electronic mail (e-mail) is transmitted from a transmitting host to a recipient. However, in such an e-mail system, before the transmitting host transmits an e-mail, a sender at the transmitting host must first specify a unique electronic mail address to which the electronic mail is to be sent. E-mail addresses are abstract in that they do not relate to any physical, identifiable information. Furthermore, unlike a home address, most recipients do not have an e-mail account.

For instance, the e-mail address, santa@mailservera.divisionone.com can be used as an e-mail address for the user Santa. There are several problems associated with e-mail addresses, however. First, e-mail addresses may change often, due to system users changing service providers. Thus, the sender may not know that the e-mail address of the recipient has changed. Secondly, there are many databases highly utilized by both private industries and public agencies that do not contain e-mail information for users. Thirdly, although one may know Santa is physically located somewhere at the North Pole, the sender wishing to send e-mail to Santa may not be able to remember Santa's exact e-mail address. Finally, and perhaps, most importantly, if the sender makes a typographical error in the e-mail address of the recipient, the piece of e-mail will not be sent.

SUMMARY OF THE INVENTION

Therefore, the present invention provides an e-mail system, an e-mail post office, and a method for forwarding e-mail, by using physical address information of the recipient and mapping that to a constant permanent e-mail address. According to one aspect of the present invention, an e-mail system is provided in which the transmitting host transmits the e-mail addressed to the recipient's physical address (e.g., home or work address).

Thus, the fact that the recipient has selected another service provider without notifying the sender does not hinder electronic communication between the parties. To send electronic mail, the sender only needs to know the name and/or physical address of the recipient. Furthermore, advertising and other mass mailing procedures can be accomplished by using files of existing databases that have been in continuous use for years. The sender can elect to use the system to send e-mail that would later be printed at a postal distribution center and distributed to the recipient via traditional delivery means. Finally, if the sender makes a typographical error in the recipient's physical address, the e-mail can be corrected by proprietary software and the mail will still arrive at the recipient's physical address.

Finally, the present invention facilitates parcel delivery by notifying the recipient of a parcel with delivery status information of the parcel while the parcel is en route to the recipient of the parcel.

Further features and advantages of the present invention, as well as the structure and operation of various embodiments of the present invention, are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
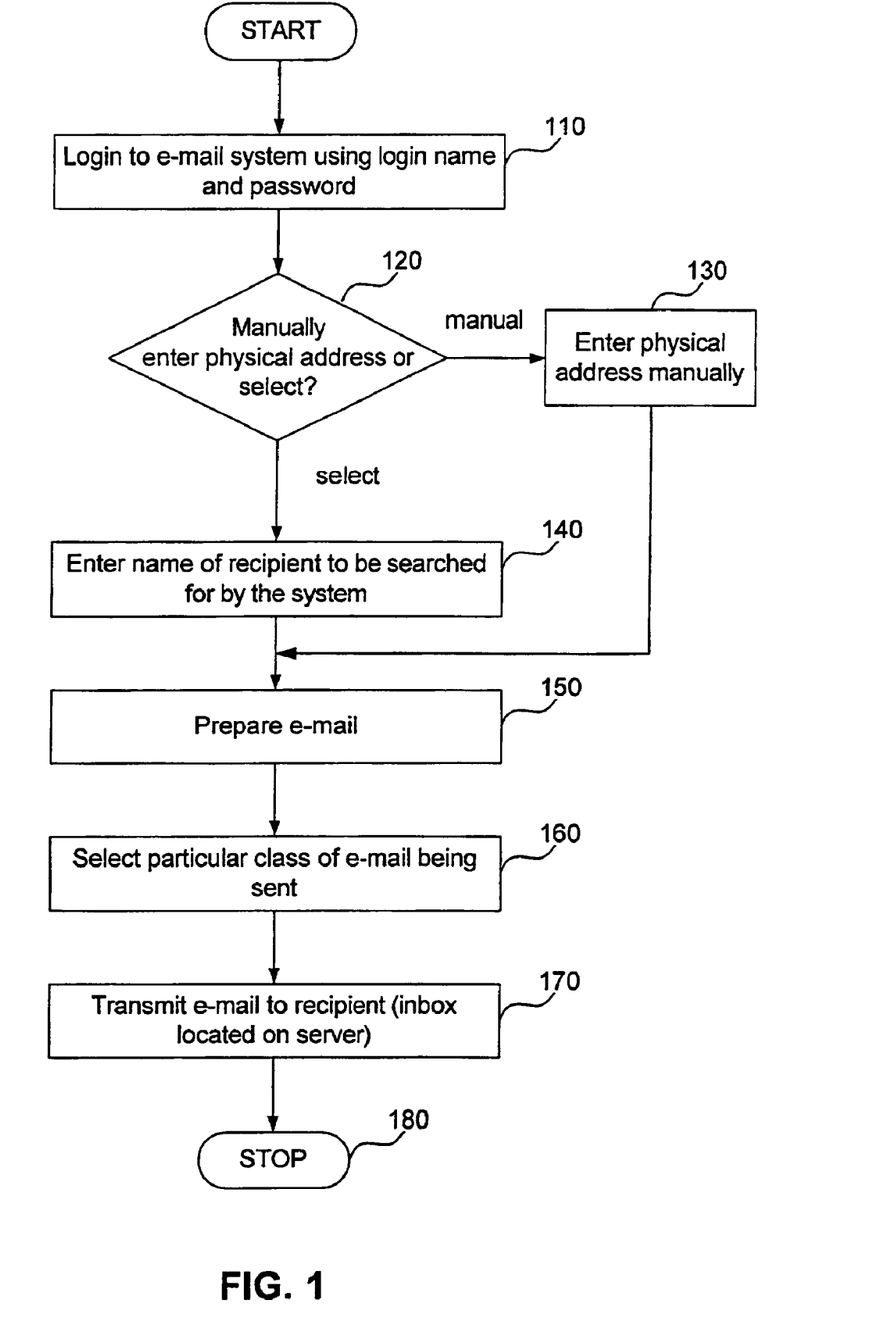
FIG. 1 is a flowchart representing the general operational flow of the steps a sender of an electronic message executes to send e-mail to the recipient using the recipient's physical address.

The present invention provides an e-mail system, an e-mail post office, and a method for forwarding e-mail, by using physical address information of a recipient. According to one aspect of the present invention, an e-mail system is provided in which the transmitting host transmits an e-mail addressed to the recipient's physical address (e.g., street, P.O. box, rural route and the like). The physical address could be the recipient's home or work address. FIG. 1 depicts the operational flow of the steps of sending an e-mail to a recipient as executed by an e-mail sender. In step 110, a sender initializes the process of transmitting e-mail by logging into the e-mail server using a login name and a password. Typically, the sender will enter the name of the recipient and his/her address. The sender is provided with the option of manually entering a physical address of the recipient or choosing the physical address of the recipient from a sender's list, as shown in step 120. It is contemplated that a conventional e-mail address can also be entered to send a message or to send a carbon copy of the message.

If the sender elects to manually input the physical address of the recipient, he is prompted to input the entire physical address information into a Graphical User Interface (GUI) of an e-mail software package, which has been modified based on the teaching herein, as shown in step 130. For instance, if the sender knows the physical address of the recipient Santa, the recipient can manually enter the address in the address line of the e-mail software application (e.g. Groupwise®, Microsoft Mail®). In such a situation, the sender enters "123 North Pole Lane, NorthPole, U.S.A." The e-mail server then receives the e-mail and determines that that particular e-mail should be routed to Santa's electronic in-box located on an e-mail server. In one embodiment, the e-mail server is maintained by the United States Postal Service (USPS).

Alternatively, using the above-described example, if the sender only knows Santa's name, the sender enters a search mode that would automatically populate an addressee line of the e-mail software package with Santa's physical address upon entry of Santa's name in the search string. Thus, the sender would enter "Santa Claus" (and/or other identifying information) as the search string, in step 140. The system would then respond by automatically placing Santa's address in the addressee field of the e-mail software package and routing the e-mail to Santa's electronic inbox located on the e-mail server. In one embodiment, the address is populated from a proprietary list. In yet another embodiment, the address is populated from a list provided by the sender (e.g., his electronic address book).

In one embodiment, the recipient's address would be hidden from the sender if a proprietary list is used and only the recipient's name would be entered into the addressee line of the e-mail package. In such a system, the sender would only be able to view the recipient's name, but the e-mail would still be routed based on the recipient's physical address.

In yet another embodiment, the recipient's physical address can be determined by searching based on the recipient's telephone number, zip code, state, or by any other information that is useful in the event that the sender does not know the physical address of the recipient. A database would be maintained (e.g., by the USPS) of this information in order to populate the address line of an e-mail. Once again, the populated address (if from other than the sender's own list) will be maintained in secrecy in one embodiment.

Prior to routing the e-mail to the recipient, proprietary software, such as Coding, Accuracy, Support System (CASS) certified software, can be used to correct typographical errors in the entered address. Other types of errors can also be corrected by the CASS certified software. For example, the CASS certified software can enhance the address to include such things as zip codes or directional designations (e.g., NW, SE, etc.) Code-1 Plus®, which is a product available from Group 1 Software of Lanham, Md., can be used in this regard. Regardless of what the sender enters as the search string, the e-mail server would route the e-mail to the recipient's inbox (located on the e-mail server) using the recipient's physical address. In one embodiment, the sender can designate that the CASS certified software not be used. In such an embodiment, as well as other embodiments, the e-mail server will send a message back to the sender if the address is not valid.

In step 150, the sender can type, scan, or attach the e-mail that is to be sent to the recipient. It should be noted that the sender need not know the location of the particular e-mail server.

In one embodiment, e-mail is divided into classes and prioritized. Such classes may or may not correspond to the existing classes of mail of the U.S. Postal Service. Each class is represented by an E-designator stamp. Thus, in step 160 the sender selects the particular class of e-mail being sent.

For example, if the sender wishes to send important first class e-mail the sender enters "E-designator-first-class" in a GUI of an e-mail software package being used. The e-mail server contains a mail control file for the particular user indicating that "E-designator-first-class" types of mail should be printed in hard copy form and distributed via traditional distribution means. The mail control file is configurable by the recipient.

If the sender wishes to send fourth class e-mail, the sender enters "E-designator-fourth-class" in the GUI of the e-mail software package being used. In such a situation, the e-mail server contains a file indicating that "D-designator-fourth-class" types of mail should be stored in the inbox of the particular recipient. In step 170, the sender transmits e-mail. An e-mail can also be tagged as time sensitive. Thus, an e-mail will only be saved in the inbox of the recipient for a predetermined amount of time (e.g., one week).

Finally, control ends with step 180.

In one embodiment, electronic document system software, such as DOC-1® available from Group 1 Software, can be used to send electronic copies of bills (e.g., Electric, Phone, Mortgage, etc.) or other electronic documents. This software maintains the look of the document such that the recipient cannot tell the difference between an electronic copy of the document or a document that is received via traditional mail.

Figure 2:
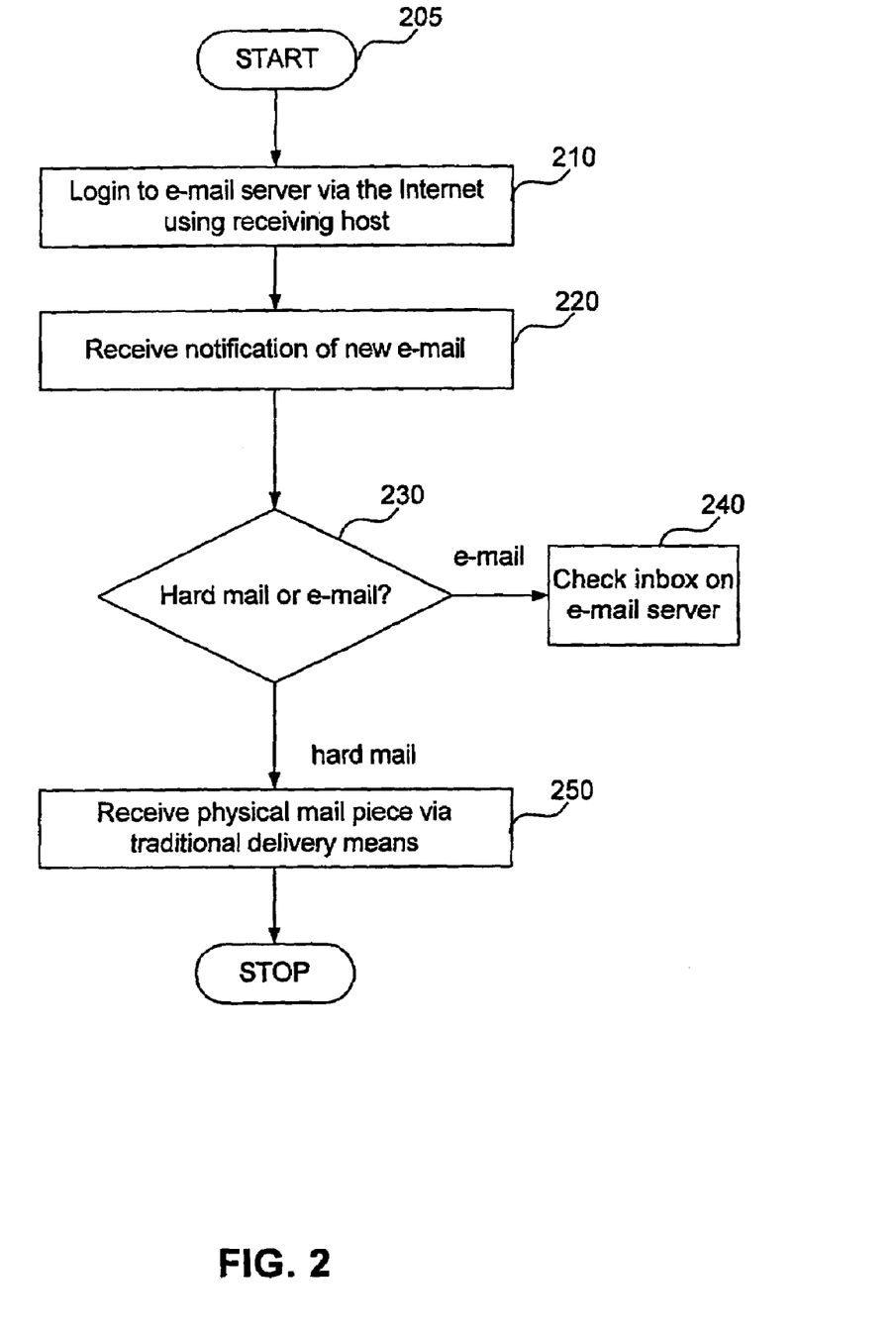
FIG. 2 is a flowchart representing the general operational flow of the steps the recipient executes to receive mail, electronically and physically.

FIG. 2 depicts the operational flow of the steps executed by the e-mail recipient to retrieve e-mail messages. In step 210, the recipient logs into the e-mail server via a recipient host (e.g., a home computer). The recipient will be asked for his/her account number and/or password. In one embodiment, the recipient's account number may be his physical address. A cookie can be used to access the e-mail account. The present invention also contemplates using biometric data (e.g., fingerprint, retina, etc.) to gain access to the e-mail account. It is critical that security be maintained on this account. Upon logging into the e-mail server via, e.g., the Internet, the recipient receives a notification of new e-mail in step 220. A direct connection can also be used to connect to the e-mail server. The recipient is allowed to view, respond and delete e-mail messages at this stage.

Recipients may not always want to access their e-mail account. Therefore, the present invention allows a recipient to designate traditional mail as an option. In step 230, the recipient is prompted regarding whether he desires to automatically receive a hard copy of the e-mail sent by the sender or only the actual e-mail sent by the sender. Thus, in one embodiment, mail is automatically distributed by a postman without first logging into the e-mail server and checking the particular inbox. In another embodiment, the recipient may wish to have some mail routed via traditional delivery means only after having viewed the e-mail.

If the recipient elects to receive an electronic copy of the actual e-mail sent by the sender, the e-mail sent by the sender is stored in the recipient's inbox located on the e-mail server, in step 240. If the recipient elects to receive a hard copy of the e-mail sent by the sender, the e-mail is routed to a printer and the recipient receives a physical mailpiece by traditional mail delivery means, in step 250. Finally, control ends with step 260.

E-mails forwarded via traditional mail can be stored in the recipient's inbox for later viewing. In another embodiment, e-mails that are forwarded via traditional mail are deleted immediately or after some designated period of time. In yet another embodiment, the recipient may designate certain classes of e-mail to be routed via traditional mail and yet other classes to be stored as electronic mail only. For example, the recipient can automatically receive important mail (e.g. first class mail) as a physical mailpiece, without first logging into the e-mail server. In such a situation, the recipient specifies in the recipient's mail control file that all first class e-mail should be printed and sent via traditional means. E-mail that is eventually printed and becomes physical mail is known as Hybrid mail. It should be noted that this electronic mail would not necessarily be traditional e-mail. Much of the e-mail received by the recipient can be an electronic version of the physical mailpiece the sender would have sent via regular mail.

The recipient's mail control file can contain E-designators. The E-designators represent the various classes of e-mail and indicate which classes are to be printed and which classes are to be electronically stored in the recipient's inbox. The classes correspond to the traditional mail classes currently used by the U.S. Postal Service, but do not necessarily have to correspond.

If e-mail received by the recipient is of a class that is to be printed (e.g. first class mail, as specified in the recipient's mail control file), this hybrid mail would be printed at a mail distribution center and then routed to the physical address of the recipient via traditional mail transporting means (e.g. a letter carrier). In another embodiment, the system sends a notification or a copy of the hybrid mail to the recipient's inbox on the e-mail server. If e-mail received by the recipient is not of a class that is to be printed (e.g. third class mail, as specified in the recipient's mail control file), the e-mail will be stored in the recipient's inbox located on the e-mail server. The recipient could also specify that certain classes of e-mail be deleted (e.g., advertisements).

In yet another embodiment, the recipient can login to the e-mail server and change corresponding identification information. Thus, this would effectively create an electronic National Change of Address (NCOA) program. The recipient will be allowed to designate whether this change can be made public or maintained in secrecy.

In still yet another embodiment, a notice can be automatically sent, via e-mail, to the sender that a document has been received and opened by a recipient. This e-mail can include the date and time the e-mail was opened. This will allow day/time certain delivery of mail/messages and an electronic trail of the entire transaction.

Figure 3:
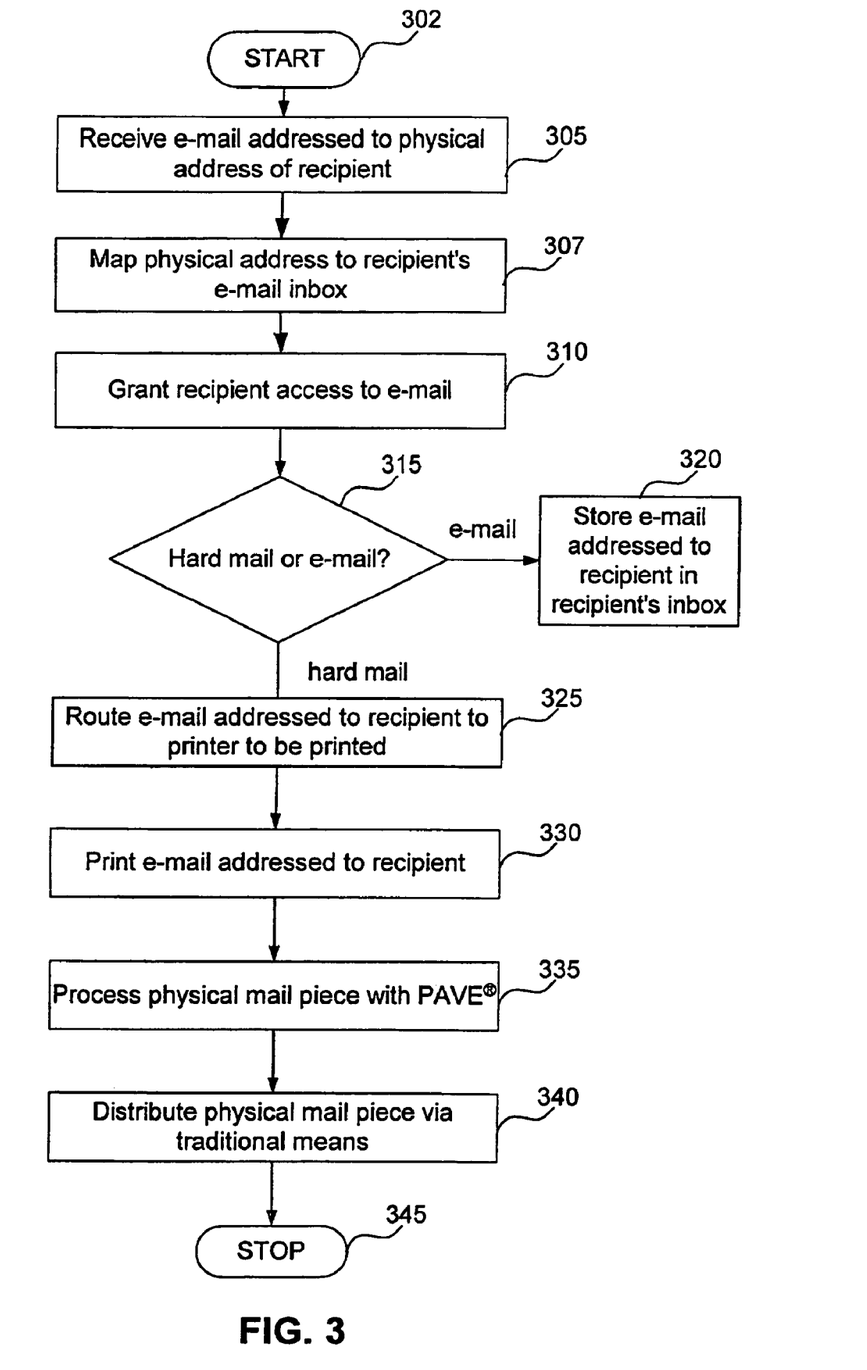
FIG. 3 is a flowchart representing the general operational flow of the steps executed by the e-mail server upon receiving e-mail addressed to the recipient.

FIG. 3 is a flowchart representing the general operational flow of the steps executed by the e-mail server, upon receiving e-mail addressed to a recipient. In step 305, the e-mail arrives at the e-mail server. The e-mail server maps a physical address to a recipient, as shown in step 307. In one embodiment, this function is performed via a database. The e-mail server includes a database with the name, address, and account information (i.e., recipient's e-mail box). Thus, the server can merely look up a recipient's e-mail in-box (or address) by using the physical address. In an alternate embodiment, a recipient's traditional e-mail address can also be stored in the database. Thus, a received e-mail can also be routed to a recipient's personal account (e.g., Microsoft, Hotmail, Erols, etc.). Other information can be stored in the database as should be apparent to one skilled in the art.

The e-mail is stored in the inbox of the particular recipient on the e-mail server. After the recipient logs into the e-mail server by connecting via the Internet, or some other means, using the recipient host, in step 310, an authoritative process stored on the e-mail server grants the recipient access to the recipient's e-mail stored in the recipient's inbox on the e-mail server.

In step 315, the system prompts the recipient regarding the desired form of communication to be received. The e-mail server either receives input from the recipient indicating that the recipient wishes to receive hybrid mail or a copy of the actual e-mail that was transmitted by the sender.

It should be noted that the e-mail does not have to be downloaded. It can be read on-line in virtually any electronic format and either archived or deleted. If the e-mail server receives input from the recipient indicating that the recipient wishes to receive a copy of the actual e-mail that was transmitted by the sender, the e-mail server stores e-mail addressed to the recipient in the recipient's inbox on the e-mail server, in step 320. If the e-mail server receives input from the recipient indicating that the recipient wishes to receive hybrid mail, the e-mail server routes the e-mail for the recipient to a printer, in step 325. In step 330, the physical mailpiece is then printed. In step 335, the physical mailpiece is electronically processed using Presort, Accuracy, Validation, and Evaluation (PAVE®) software. One such product is MailStream Plus®, which is available from Group 1 Software of Lanham, Md. This software presorts the mail in accordance with USPS regulations to maximize postage discounts. In step 340, the physical mailpiece is distributed via traditional distribution means. Finally, control ends with step 345.

In another embodiment, the e-mail server can read information stored in the recipient's mail control file to determine particular classes for which the recipient has chosen to receive a physical mailpiece. Such a determination is made based on the E-designators specified in the particular recipient's mail control file. In one embodiment, separate folders can be created for each class of e-mail. Of course, this feature can be customized based on the recipient's needs.

For example, the recipient specifies that the recipient desired all first class e-mail to be distributed via traditional mail delivery means. Such e-mail is stamped with a "First-class-E-designator." In such a case, when the e-mail server receives mail from the sender with that particular E-designator, the e-mail server routes the particular message to the printer. The printer prints a physical copy of the e-mail, and the postal service then delivers the physical mailpiece via traditional delivery means.

After this hybrid mail is printed, it is presorted by Presort, Accuracy, Validation, and Evaluation (PAVE®) software. Planet codes, information rich barcodes and other data can be appended to the document. The e-mail is then routed to the physical address specified by the sender via traditional mail transporting means (e.g. a letter carrier). In yet another embodiment, the system sends a notification or a copy of the hybrid mail to the recipient's inbox on the e-mail server. The system assigns a unique identifier for each piece of hybrid mail. This allows the system to account for spoilage by allowing the re-creation of damaged mail and the placement back into the mailstream. The unique identifier can also be forwarded to the local USPS location so that the facility can know what is coming, verify postage, plan transportation, etc.

If the e-mail server receives mail from the sender with a particular E-designator stamp that indicated that it should not be printed, the e-mail server stores the e-mail in the recipient's inbox.

Figure 4:
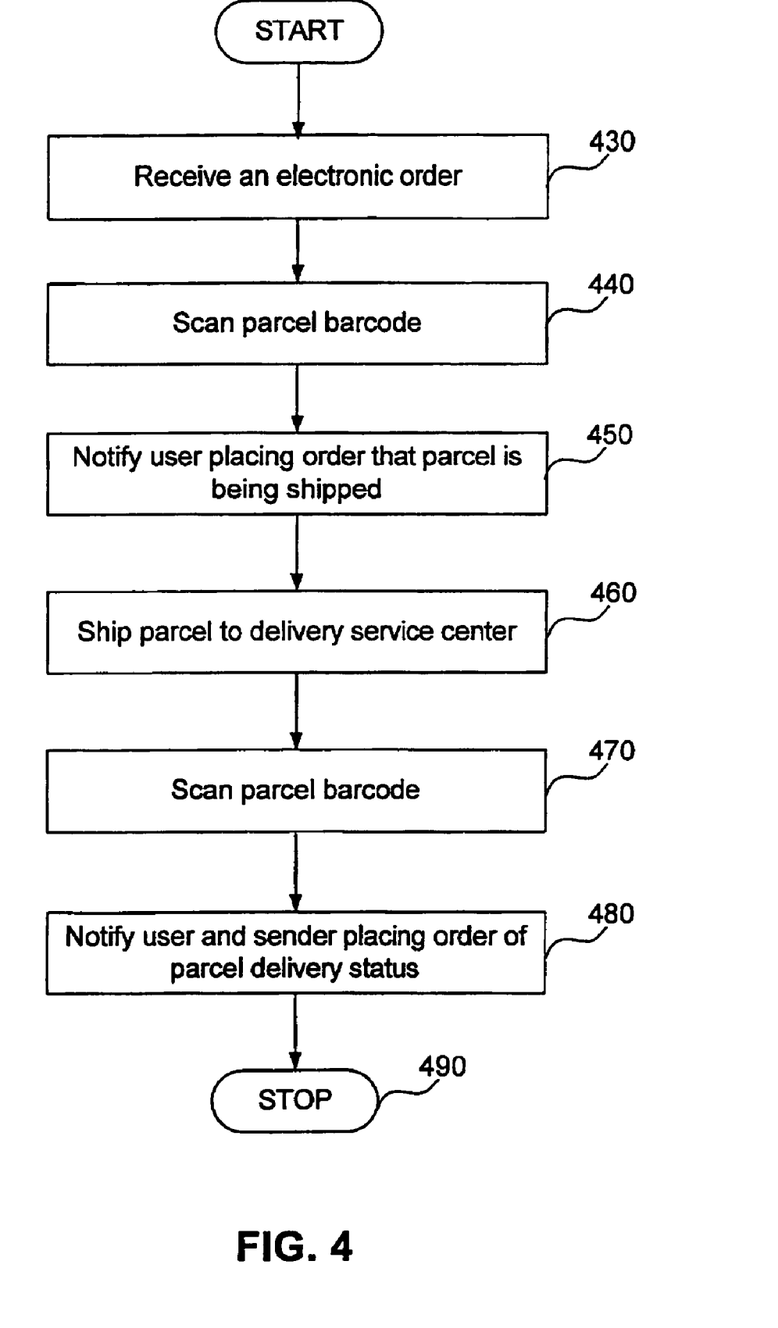
FIG. 4 is a flowchart representing the general operational flow for a method of notifying a recipient with status information of a transmitted parcel.

FIG. 4 depicts the operational flow for the process in which parcels are processed. An order is placed by a user wishing to receive a parcel (step not shown in FIG. 4). For example, a recipient desiring to receive a pair of shoes from a catalog distribution center, logs into the email server using his host. The user desiring to receive the parcel then enters the parcel delivery system of the sender distribution center. After entering the system, the user desiring to receive the parcel places an order for the shoes electronically by answering a series of questions, including being prompted for physical address information.

In step 430, the sender of the parcel receives the electronic order, generates electronic postage, and places a barcode label on the parcel using Information-Based Indicia (IBI)® or Information-Rich Barcode (IRB)® software. The barcode is generated based off of the information taken from the electronic order placed by the user and other information automatically generated by the Information-Rich Barcode (IRB)® or Information-Based Indicia (IBI)® software (e.g. a tracking number).

In step 440, the sender scans the barcode label. In step 450, upon scanning the barcode label, the recipient of the parcel is notified via e-mail that his parcel is currently being shipped. Once again, only the physical address and/or name of the recipient (e.g., the buyer) of the package is used to send the e-mail notification. Other information such as a tracking number, expected shipping date, expected delivery date, and delivery service is included in the e-mail sent to the buyer who placed the parcel order.

In step 460, the parcel is shipped from the catalog distribution center to a delivery service center. In step 470, upon arrival at the delivery service center, the parcel is scanned again. In step 480, upon scanning, the e-mail server automatically sends another electronic notification message to the recipient that the parcel has arrived. The e-mail server also sends an electronic message to the sender that the parcel was delivered. Finally, control ends with step 490.

In another embodiment, the system can be used to return merchandise. An e-tailer can allow a recipient of a package to print a return label with postage using IBI/IRB software. The return label can be scanned by USPS (for example), which will result in an e-mail being forwarded to the original package recipient and e-tailer. The e-tailer can scan the package upon receipt, thus generating a final e-mail back to the original package recipient (consumer).

Figure 5:
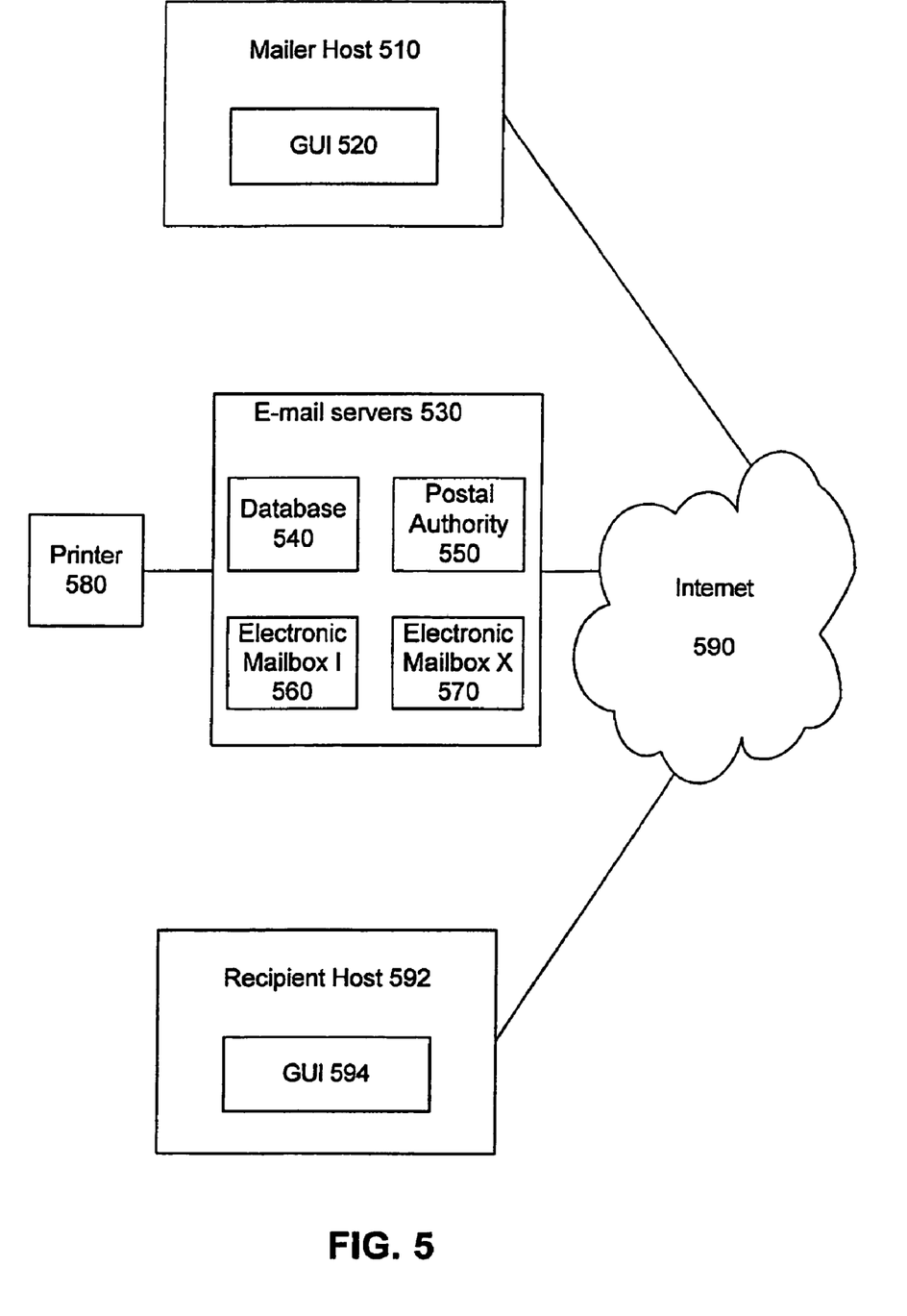
FIG. 5 is a block diagram of an example electronic mail system in which a sender sends electronic mail to a recipient using the recipient's physical address.

FIG. 5 is a block diagram illustrating the physical architecture of an e-mail routing system 500, according to an embodiment of the present invention. It should be understood that the particular e-mail routing system 500 in FIG. 5 is shown for illustrative purposes only and does not limit the invention. As would be apparent to one skilled in the relevant art, recipient host 580 and senderr host 510 can be directly connected to e-mail server 530, and sender host 510 can be directly connected to e-mail server 530.

Mailer host 510 is a host allowing the sender (also referred to as a mailer) to connect to the e-mail server 530. The sender uses Graphical User Interface (GUI) 520 to e-mail the recipient. Upon connecting to e-mail server 530, the sender enters a physical address into the GUI 520 manually, or the sender selects from the list of information provided by proprietary database 540. Once again, a sender's database located on the sender host 510 can also be used.

The e-mail routing system 500 includes e-mail server 530. E-mail server 530 includes database 540. Database 540 can be any database system known to one skilled in the art such as Oracle or Sybase. E-mail server 530 also contains postal authority 550. Postal authority 550 is an authoritative process running on e-mail server 530 that performs security checking. Electronic mailbox 560 represents the electronic mailbox of one particular recipient, and electronic mailbox 570 represents the electronic mailbox of another recipient. Thus, each recipient has an electronic mailbox where the e-mail for that particular recipient is stored. In one embodiment, each member of a household can have a separate electronic mailbox. The only limitation to the number of electronic mailboxes is the physical constraints of the server 530.

The e-mail server 530 can also be adapted to forward e-mails via wireless communication. Thus, any of the e-mail messages described herein can be sent to a recipient's PDA, cell phone, laptop, etc. automatically. Alternatively, the recipient can designate which, if any, e-mail messages will be forwarded using wireless communication.

Printer 592 can be any printer traditional network printer and is used by e-mail server 530 to print hard copies of e-mail in the situation where the recipient has specified receiving mail in hard copy form (i.e. hybrid mail). The printer can be located local to the e-mail server 530 or at a geographically remote site, such as the recipient's local USPS facility.

Recipient host 580 is used by the recipient to connect to e-mail server 530 via Internet 598. Recipient host 580 contains GUI 590. The recipient uses GUI 590 to check the recipient's e-mail stored in electronic mailbox 560. In one embodiment GUI 590 can be used by the recipient to specify whether the recipient desires to receive physical mail or e-mail or a combination thereof.

In yet a further embodiment, the recipient host 580 may be a virtual station at the USPS facility. Alternatively, the recipient host 580 may be a kiosk in a shopping mall or street corner. Thus, a recipient could access his e-mail account from anywhere in the world.

Figure 6:
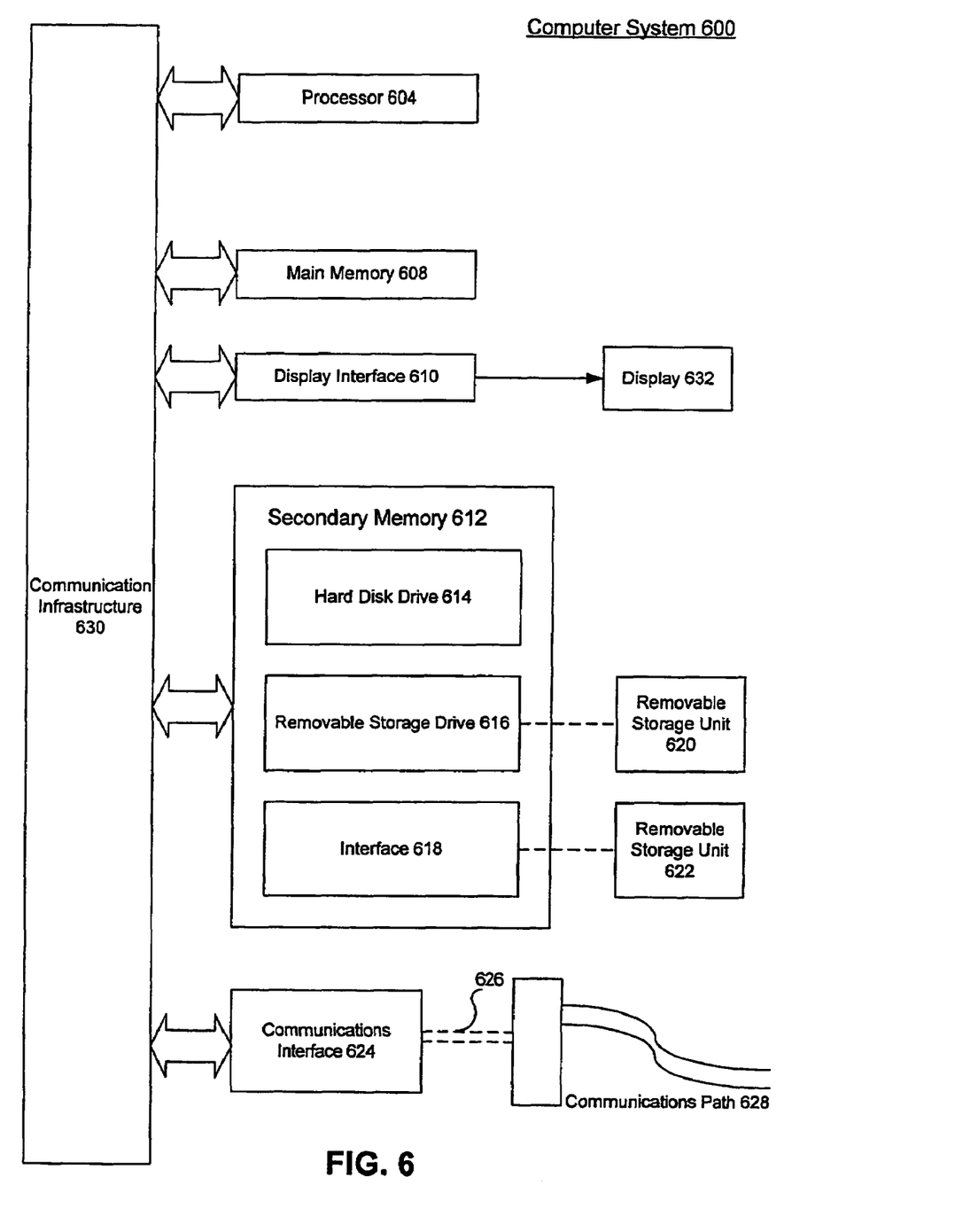
FIG. 6 is a block diagram of an exemplary computer system useful for implementing the invention.

The present invention may be implemented using hardware, software or a combination thereof and may be implemented in one or more computer systems or other processing systems. In fact, in one embodiment, the invention is directed toward one or more computer systems capable of carrying out the functionality described herein. An example of a recipient host 580, sender host 510 or e-mail server 530 is shown in FIG. 6. The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600. The invention is directed to such computer program products.

Computer programs (also called computer control logic) are stored in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A system for routing e-mails, comprising:
   a server that includes a database, said database including a mapping from a physical mailing address to an e-mail address, wherein said server including means for mapping a physical mailing address to an address of an electronic mailbox upon receipt of an e-mail from a party, said server is connected to a network, said server further including an electronic mailbox for each physical mailing address, wherein said electronic mailbox is associated with an account number and password; and
   a recipient host that includes a web browser, said recipient host connected to said network, wherein said host can access said electronic mailbox on said server using said account number and said password.

2. The system of claim 1, wherein said server provides means for allowing said recipient to request that said e-mail be printed and forwarded via traditional mail using the physical mailing address.

3. The system of claim 1, wherein
   said server provides a graphical user interface that allows a recipient to select whether electronic mail is delivered to said electronic mailbox or is delivered via traditional mail.

4. The system of claim 1, further comprising
   a mailer host that includes a web browser, said mailer host connected to said network, wherein said mailer host includes a graphical user interface that allows said server to forward an e-mail to said recipient using said physical mailing address.

5. The system of claim 1, further comprising
   an interface that allows a party to send an e-mail using a physical mailing address, said interface providing means for correcting said physical mailing address.

6. The system of claim 5, wherein said e-mail can be tagged as time sensitive by said party.

7. The system of claim 1, wherein,
   said e-mail address comprises a traditional e-mail address.

8. A method for routing e-mail, comprising the following steps:
   allowing a user to specify a physical mailing address of a recipient to whom the e-mail is to be sent; and
   performing a mapping function on a server, said mapping function mapping said physical mailing address of said recipient to an e-mail address of said recipient.

9. The method of claim 8, further comprising the step of
   allowing said recipient to choose between receiving a physical mailpiece and an e-mail, wherein if said recipient chooses to receive e-mail, then storing the e-mail in an electronic mailbox for said recipient; and wherein if said recipient chooses to receive physical mail, then routing the e-mail to a printer where the e-mail is printed and delivered via traditional mail delivery means.

10. The method of claim 9, further comprising the steps of:
    associating said e-mail with one of a plurality of classes via an E-designator tag; and
    specifying said classes for which said recipient desires to receive a physical mailpiece and said classes for which said recipient desires to receive e-mail.

11. The method of claim 8, further comprising
    storing the e-mail in an electronic mailbox, wherein said electronic mailbox is associated with said recipient.

12. The method of claim 11, further comprising
    allowing said recipient to access said electronic mailbox using an account number and password.

13. The method of claim 11, further comprising
    requiring said recipient to enter biometric data to access said electronic mailbox.

14. The method of claim 8, further comprising
    printing the e-mail and mailing it to said recipient via traditional mail delivery means.

15. The method of claim 8, further comprising
    allowing said user to associate the e-mail with a class of service selected from a plurality of classes.

16. The method of claim 8, wherein,
    said e-mail address comprises a traditional e-mail address.

17. A method for routing e-mail, comprising the following steps:

receiving an e-mail addressed using a physical address of a recipient, wherein said e-mail has a designator tag that associates said e-mail with one or a plurality of classes of service;

performing a mapping function on a server upon receipt of said e-mail, said mapping function mapping said physical address of said recipient to an e-mail address of said recipient;

specifying said classes for which said recipient desires to receive a physical mailpiece and said classes for which said recipient desires to receive an actual copy of the e-mail in a mail control file;

storing the e-mail in an electronic mailbox of said recipient; and if said recipient chooses to receive physical mail, then routing the e-mail to a printer where the e-mail is printed, delivering the e-mail via traditional mail delivery means, and electronically notifying said recipient and sender that a physical copy of the e-mail was sent to said recipient.

18. The method of claim 17, wherein, said e-mail address comprises a traditional e-mail address.

19. A system for routing e-mails, comprising:

a server that includes a database, said database including a mapping from a physical mailing address to an e-mail address, wherein said server is connected to a network, said server further including an electronic mailbox for each physical mailing address, wherein said electronic mailbox is associated with an account number and password, wherein said server includes a mail control file containing E-designators, said E-designators representing classes of service; and a recipient host, said host being able to access e-mails on said server using said account number and said password.

20. A method for parcel delivery notification, comprising the following steps:
(a) receiving an electronic order for a parcel;
(b) generating a parcel barcode;
(c) scanning a parcel barcode;
(d) sending an e-mail to a buyer who placed said electronic order by e-mail, wherein a physical mailing address of said buyer is used to send said e-mail, said step (d) occurring upon executing said scanning step (c);
(e) shipping the parcel to a parcel delivery center;
(f) scanning the parcel barcode at said parcel delivery center; and
(g) electronically notifying said buyer who placed said electronic order by e-mail, wherein said physical mailing address of said buyer is used to send said e-mail, said step (g) occurring upon executing said step (f).

* * * * *

(12) INTER PARTES REEXAMINATION CERTIFICATE (959th)
United States Patent
King et al.

(10) Number: US 7,478,140 C1
(45) Certificate Issued: Sep. 9, 2014

(54) SYSTEM AND METHOD FOR SENDING ELECTRONIC MAIL AND PARCEL DELIVERY NOTIFICATION USING RECIPIENT'S IDENTIFICATION INFORMATION

(75) Inventors: Tim King, Elkridge, MD (US); Alan Slater, Clifton, VA (US); Victor Forman, Tucson, AZ (US); Tim Waggoner, Mitchellville, MD (US)

(73) Assignee: Pitney Bowes Software Inc., Lanham, MD (US)

Reexamination Request:
No. 95/001,300, Jan. 22, 2010

Reexamination Certificate for:
Patent No.: 7,478,140
Issued: Jan. 13, 2009
Appl. No.: 09/801,725
Filed: Mar. 9, 2001

Related U.S. Application Data

(60) Provisional application No. 60/188,006, filed on Mar. 9, 2000.

(51) Int. Cl.
*G06F 15/16* (2006.01)

(52) U.S. Cl.
USPC ............................................................ 709/217

(58) Field of Classification Search
USPC ......................................................... 709/217
See application file for complete search history.

(56) References Cited

To view the complete listing of prior art documents cited during the proceeding for Reexamination Control Number 95/001,300, please refer to the USPTO's public Patent Application Information Retrieval (PAIR) system under the Display References tab.

*Primary Examiner* — Jalatee Worjloh (57) ABSTRACT

The present invention is a system and method for routing e-mails based on the recipient's physical address. The system includes an e-mail server that contains a database that maps physical addresses to e-mail addresses of users. The e-mail server is connected to a network such as the global Internet. The e-mail server includes an electronic mailbox for each physical address in the database. The system also includes a receiving host that is used to connect to the e-mail server via the Internet to enable a recipient user to check e-mail. The e-mail server runs an authoritative process by which user login and password information is checked to assure a secure system. The system also has a parcel delivery notification feature that allows a buyer expecting a parcel to receive delivery status information regarding the particular parcel being shipped to the buyer.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-19 are cancelled.

Claim 20 is determined to be patentable as amended.

New claim 21 is added and determined to be patentable.

20. A method for parcel delivery notification, comprising the following steps:

(a) receiving an electronic order for a parcel;
(b) generating a parcel barcode;
(c) scanning a parcel barcode;
(d) sending an e-mail to a buyer who placed said electronic order by e-mail, wherein a physical mailing address of said buyer is used to send said e-mail *using a physical mailing address field*, said step (d) occurring upon executing said scanning step (c);
(e) shipping the parcel to a parcel delivery center;
(f) scanning the parcel barcode at said parcel delivery center; and
(g) electronically notifying said buyer who placed said electronic order by e-mail, wherein said physical mailing address of said buyer is used to send said e-mail *using a physical mailing address field*, said step (g) occurring upon executing said step (f).

*21. The method of claim 20, further comprising:*
*electronically notifying a seller of the parcel after the parcel barcode is scanned at said parcel delivery center.*

\* \* \* \* \*